(12) United States Patent
Walczak et al.

(10) Patent No.: US 6,481,293 B1
(45) Date of Patent: Nov. 19, 2002

(54) ELBOW MOUNTED TURBINE FLOWMETER

(75) Inventors: Thomas J. Walczak, Nashota, WI (US); Kenneth J. Sieth, Delafield, WI (US); Thomas P. Honzelka, Grafton, WI (US)

(73) Assignee: Osmonics, Inc., Milwaukee, WI (US)

( * ) Notice: Subject to any disclaimer, the term of this patent is extended or adjusted under 35 U.S.C. 154(b) by 0 days.

(21) Appl. No.: 09/381,324

(22) PCT Filed: Mar. 16, 1998

(86) PCT No.: PCT/US98/05132

§ 371 (c)(1),
(2), (4) Date: Dec. 27, 1999

(87) PCT Pub. No.: WO98/41819

PCT Pub. Date: Sep. 24, 1998

Related U.S. Application Data

(60) Provisional application No. 60/039,626, filed on Mar. 19, 1997.

(51) Int. Cl.[7] .......................... G01F 15/00; G01F 15/06; G01F 1/05
(52) U.S. Cl. ................. 73/861.77; 73/861.78; 73/861.79
(58) Field of Search .................. 73/861.77, 861, 73/861.78, 861.79; 181/25; 418/6

(56) References Cited

U.S. PATENT DOCUMENTS

| | | | | |
|---|---|---|---|---|
| 3,878,718 A | * | 4/1975 | Sugiyama et al. | 73/231 R |
| 4,132,453 A | * | 1/1979 | Burrus et al. | 308/238 |
| 4,308,755 A | * | 1/1982 | Millar et al. | 73/861.77 |
| 4,825,707 A | | 5/1989 | Rosaen | 73/861.77 |
| 4,936,151 A | | 6/1990 | Tokio | 73/861.77 |
| 5,382,124 A | * | 1/1995 | Frattarola | 411/352 |
| 5,877,429 A | * | 3/1999 | Gauley et al. | 73/861.77 |

OTHER PUBLICATIONS

International Search Report for PCT Application PCT/US98/05132, under date of Jul. 30, 1998.

* cited by examiner

Primary Examiner—Benjamin R. Fuller
Assistant Examiner—Lilybett Martir
(74) Attorney, Agent, or Firm—Quarles & Brady LLP

(57) ABSTRACT

A flowmeter includes a conduit having an elbow portion and a straight section downstream of the elbow. A turbine is mounted inside the conduit in the straight section adjacent the elbow portion. The turbine occupies less than the entire cross section of the conduit and is disposed adjacent the side of the conduit which receives the laminar flow exiting from the elbow portion. A permanent magnet is mounted on the turbine, the rotation of which is picked up by a Hall-effect sensor mounted in a cavity in a wall of the conduit.

18 Claims, 4 Drawing Sheets

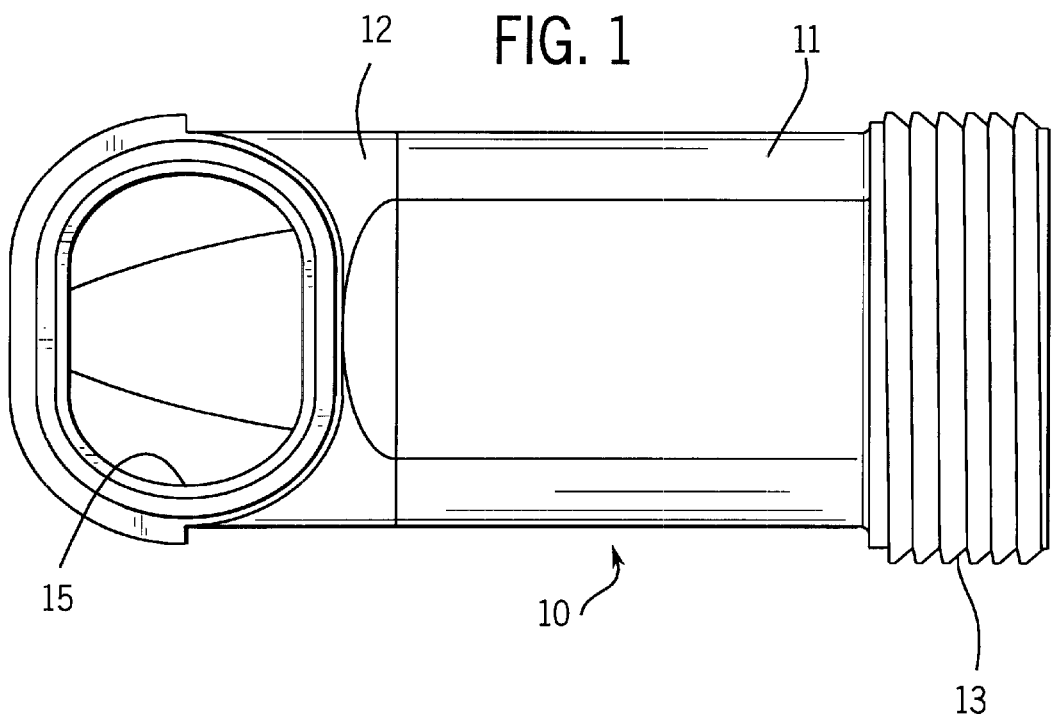
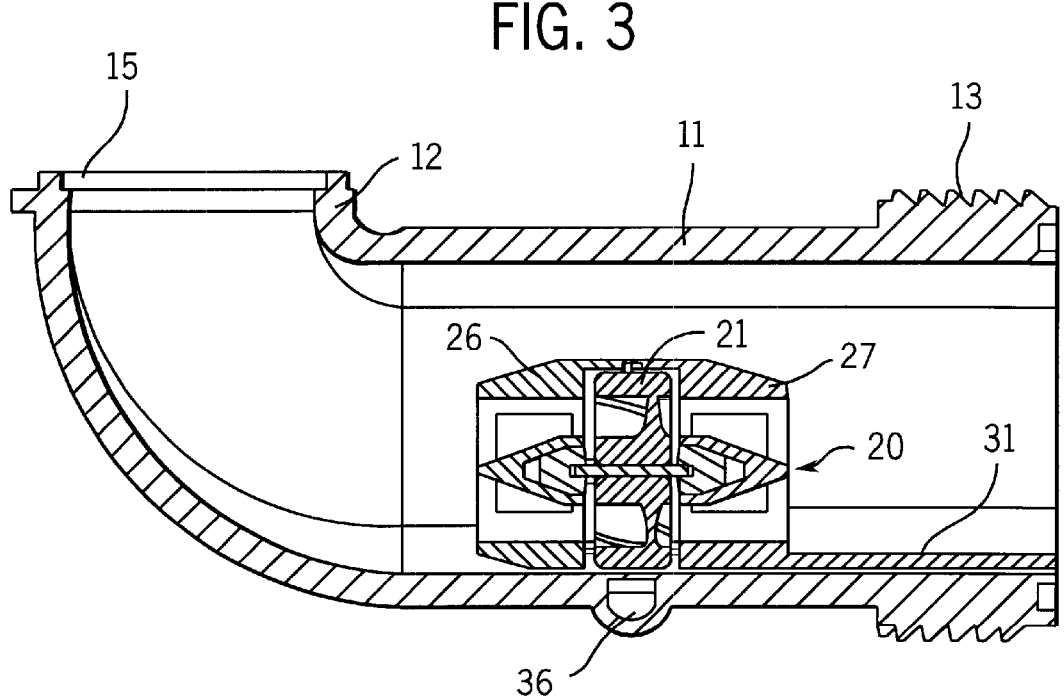

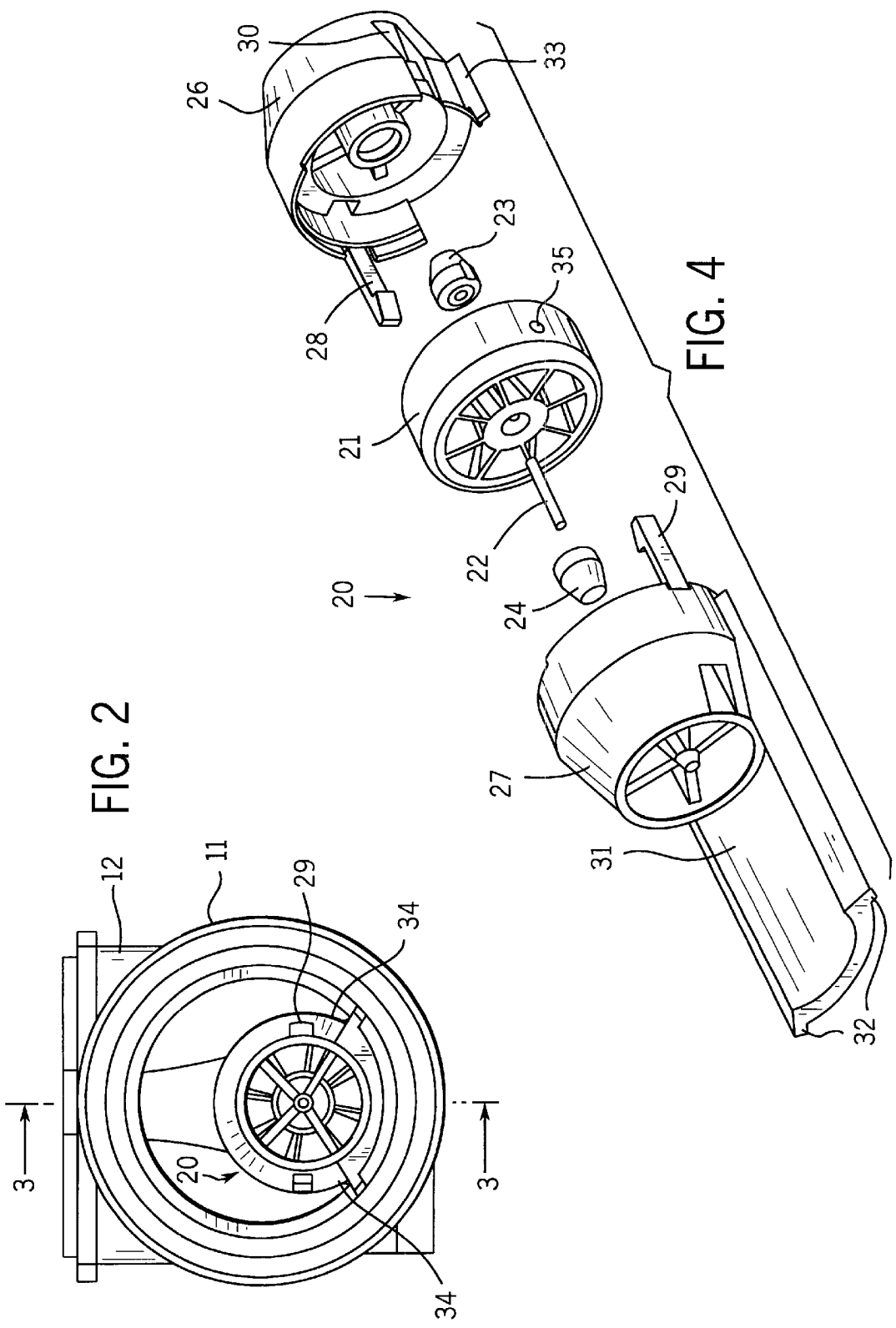

ELBOW MOUNTED TURBINE FLOWMETER

CROSS REFERENCES TO RELATED APPLICATIONS

This application claims the benefit of U.S. Provisional Application No. 60/039,626, filed on Mar. 19, 1997.

STATEMENT REGARDING FEDERALLY SPONSORED RESEARCH

Not Applicable

BACKGROUND OF THE INVENTION

This invention relates to turbine flowmeters and particularly to a turbine flowmeter mounted adjacent an elbow of a conduit.

Turbines are widely used to monitor the flow of fluid through conduits. Typically, the turbine occupies the full cross-section of the conduit so that the entire flow rotates the turbine. Generally, the turbine mounts a permanent magnet whose rotation with the turbine is detected by a Hall-effect sensor disposed adjacent the turbine. The frequency of pulses generated by the sensor directly correlates with the volume of flow through the turbine.

The present invention is directed to a turbine flowmeter which does not occupy the entire cross-section of the conduit in which it is mounted, but which provides an accurate indication of the total amount of fluid flow through the conduit.

SUMMARY OF THE INVENTION

In accordance with the invention, a flowmeter includes a conduit having an elbow portion and a straight section downstream of the elbow. A turbine is mounted inside the conduit in the straight section adjacent the elbow portion. The turbine occupies less than the entire cross section of the conduit and is disposed adjacent the side of the conduit which receives the laminar flow exiting from the elbow portion.

Preferably, the turbine is mounted in a structure that is insertable into the conduit. In one embodiment, the structure is inserted through the open end of the straight section. In a second embodiment, the structure is inserted through an opening in the elbow portion.

The turbine contains a permanent magnet, the rotation of which is picked up by a Hall-effect sensor mounted in a cavity in a wall of the conduit.

It is a principal object of the invention to provide a turbine flowmeter that occupies only a portion of the cross-section of the conduit through which the fluid is to flow but which gives an accurate indication of the total flow through the conduit.

The foregoing and other objects and advantages of the invention will appear in the detailed description which follows. In the description, reference is made to the accompanying drawings which illustrate preferred embodiments of the invention.

BRIEF DESCRIPTION OF THE DRAWINGS

FIG. 1 is a top view of a first embodiment of a flowmeter in accordance with the invention;

FIG. 2 is an end view of the flowmeter of FIG. 1;

FIG. 3 is a view in vertical section taken in the plane of the line 3—3 of FIG. 2;

FIG. 4 is an exploded view of the turbine assembly of the first embodiment of the flowmeter;

DETAILED DESCRIPTION OF THE PREFERRED EMBODIMENTS

Figure 5:
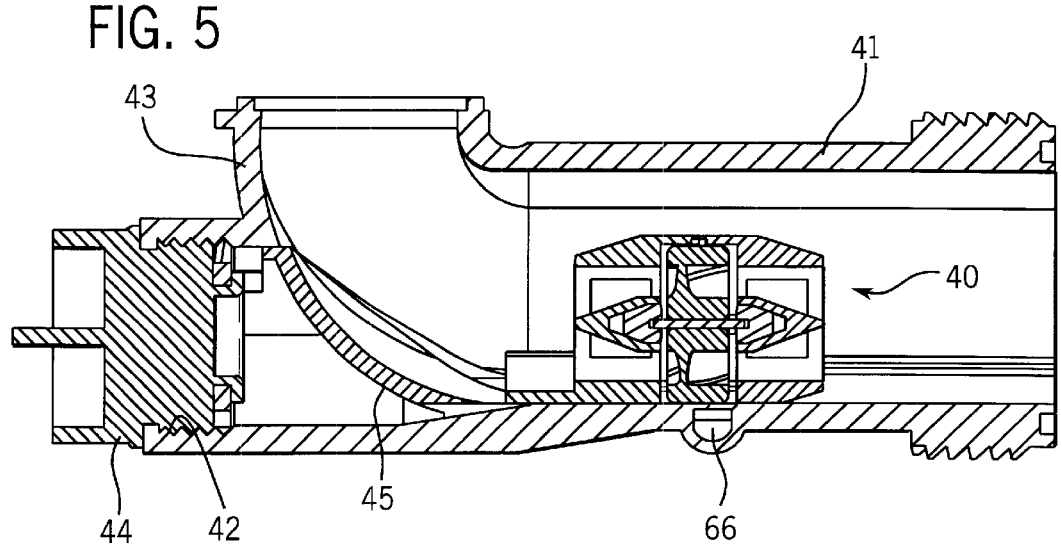
FIG. 5 is a view in vertical cross section of a second embodiment of the flowmeter.

The flowmeter of FIGS. 1–4 includes a conduit 10 having a straight section 11 mounted downstream of an integral elbow portion 12. The straight section 11 preferably has a circular cross-section and may be provided with threads 13 to connect to plumbing. The elbow portion 12 in the embodiment illustrated has a cross-section which transitions from that of an oval at its open end 15 to a circle at the junction with the straight section 11.

A turbine assembly indicated generally by the numeral 20 is mounted in the conduit 10 at the bottom of the straight section 11 adjacent the elbow portion 12. The turbine assembly 20 includes a turbine 21 mounted on a shaft 22 the ends of which are received in bearings 23 and 24. The bearings 23 and 24 are mounted in upstream and downstream cowl members 26 and 27, respectfully. The cowl members 26 and 27 are held together by arms 28 and 29 projecting from the members 26 and 27 and snapped in place into recesses 30 in the opposite cowl member. The downstream cowl member 27 includes an integral trough member 31 which is adapted to extend along the bottom of the straight section 11 of the conduit 10. The trough member 31 has projecting legs 32 which align with legs 33 on the upstream cowl member 26. The legs 32 and 33 are received in parallel recesses 34 in the bottom of the straight section 11, as shown in FIG. 3.

The turbine 21 mounts a permanent magnet 35. A Hall-effect sensor (not shown) is mounted in a cavity 36 in the wall of the conduit 10. The cavity 36 extends tangentially of the conduit.

Fluid flow through the elbow section 12 will tend to be laminar at low flow rates along the outside of the bend of the elbow portion 12. The turbine 21 will be exposed to near laminar flow and with the highest velocity exiting from the elbow portion 12. Although the turbine assembly 20 fills only a small portion of the overall cross-section of the conduit, it will provide an accurate metering of the total flow through the conduit because it is exposed to the highest velocity within the laminar flow.

Figure 6:
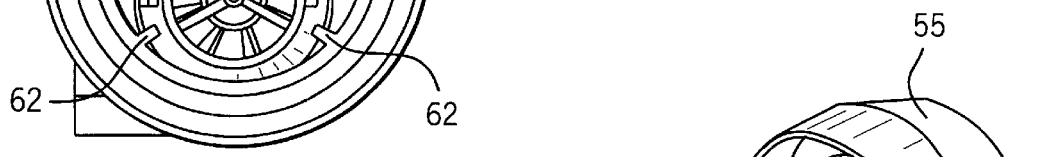
FIG. 6 is an end view of the flowmeter of FIG. 5.
Figure 7:
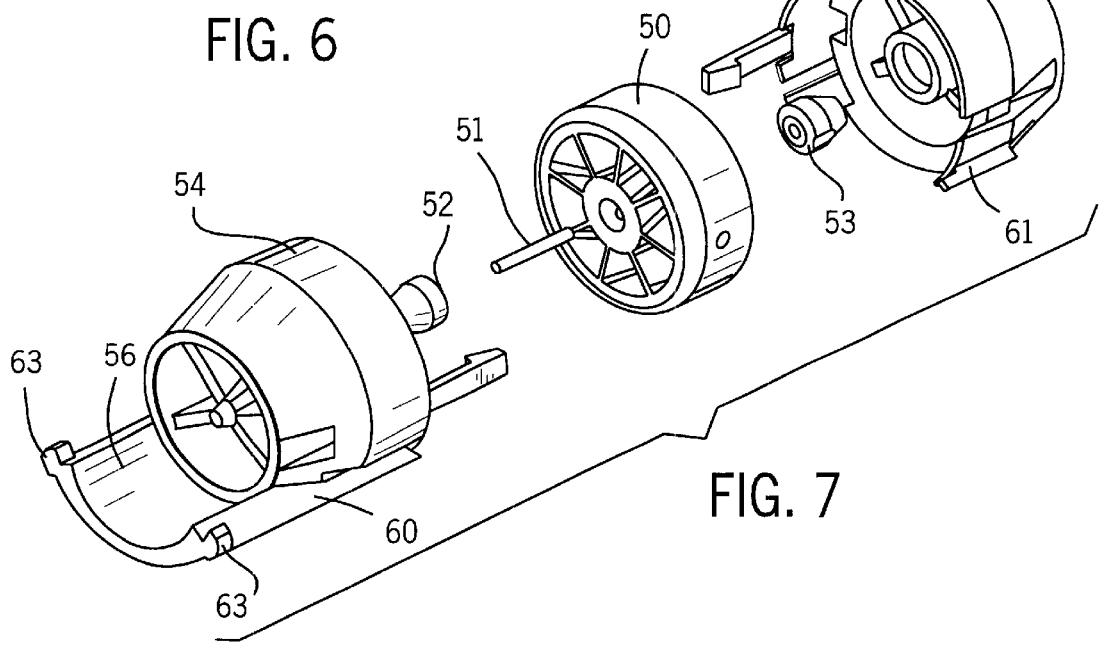
FIG. 7 is an exploded view of the turbine assembly of the second embodiment of the flowmeter.
Figure 8:
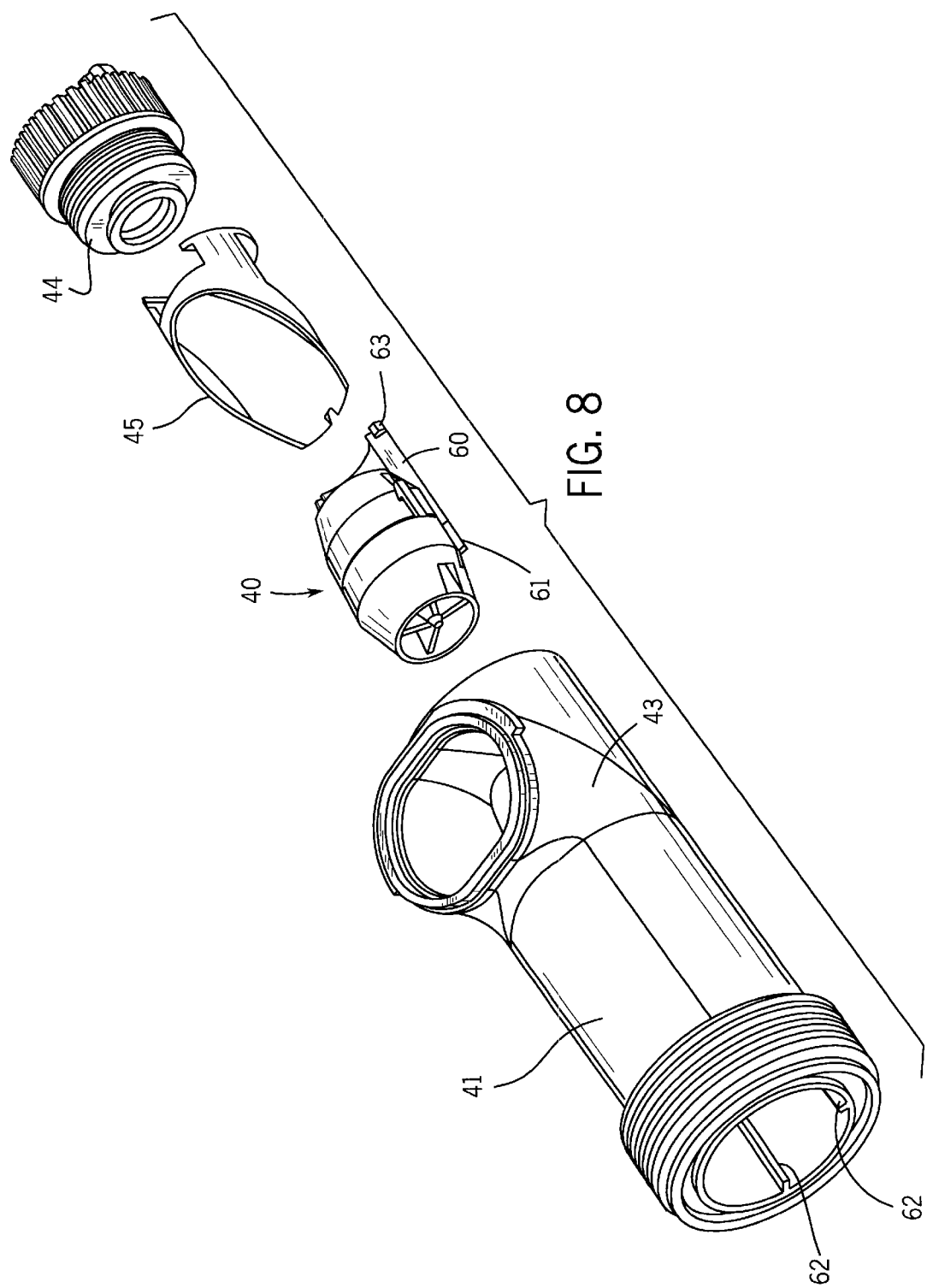
FIG. 8 is an exploded view of the components of the second embodiment of the flowmeter.

In the second embodiment of the flowmeter shown in FIGS. 5–8, a turbine assembly indicated generally by the numeral 40 is inserted into the straight section 41 of a conduit through a threaded opening 42 in the elbow section 43. The threaded opening 42 is closed by a threaded plug 44. An elbow insert 45 defines a continuation of the portion of the outer bend of the elbow that is removed to allow for the opening 42. The elbow insert 45 is held in place by the plug 44.

The turbine assembly 40 includes a turbine 50 mounted on a shaft 51, the ends of which are received in bearings 52 and 53. The bearings 52 and 53 are mounted in upstream and downstream cowl members 54 and 55, respectively. The upstream cowl member 54 includes an integral trough portion 56 which extends towards the elbow insert 45. The cowl members 54 and 55 snap together as in the assembly 20 of the first embodiment. The upstream cowl member has wings 60 extending from its sides and the downstream cowl member 55 has similar wings 61. The wings 60 and 61 are received beneath rails 62 extending from the sides of the straight section 41 of the conduit. The wings 60 of the upstream cowl member 54 terminate in stops 63 which define the extent of insertion of the turbine assembly 40 within the straight section 41 of the conduit. As with the first embodiment, the turbine 50 would include a permanent magnet 65, and a Hall-effect sensor (not shown) would be inserted into a tangential cavity 66 in the outside of the straight section 41.

The flowmeter of the second embodiment allows the removal and replacement or servicing of the turbine assembly 40 without disturbing the plumbing of the straight section 41 or elbow section 43.

We claim:

1. A turbine flowmeter for measuring fluid flow comprising:

a conduit having an elbow and an integral straight section downstream of said elbow, said elbow having an inner bend and an outer bend, and said straight section having a bottom wall and a top wall which define a center therebetween, wherein laminar fluid flowing through said elbow along said outer bend flows proximal said bottom wall;

a turbine assembly having a turbine with a permanent magnet mounted thereon, said turbine assembly being mounted downstream of said elbow in said straight section and offset from said center proximal said bottom wall, wherein the laminar fluid flowing proximal said bottom wall drives said turbine; and a Hall-effect sensor mounted adjacent said turbine for detecting rotation of said permanent magnet on said turbine.

2. A turbine flowmeter as claimed in claim 1, wherein said straight section has a cross section which is circular.

3. A turbine flowmeter as claimed in claim 2, wherein said elbow has a cross section that transitions from an oval to a circle, and said elbow circle cross section is at a junction with said straight section.

4. A turbine flowmeter as claimed in claim 1, wherein said straight section has threads.

5. A turbine flowmeter as claimed in claim 1, wherein said turbine assembly has an upstream cowl member and a downstream cowl member, said turbine is rotatably mounted on a shaft fixed to at least one of said cowl members.

6. A turbine flowmeter as claimed in claim 5, wherein said cowl members have bearings for receiving ends of said shaft.

7. A turbine flowmeter as claimed in claim 5, wherein said cowl members have projecting arms that are snapped into recesses in said opposite cowl member.

8. A turbine flowmeter as claimed in claim 5, wherein said downstream trough member extends along said bottom wall of said straight section of said conduit.

9. A turbine flowmeter as claimed in claim 1, wherein said Hall-effect sensor is mounted in a cavity formed in one of said walls of said conduit.

10. A turbine flowmeter as claimed in claim 9, wherein said cavity extends tangential to said conduit.

11. A turbine flowmeter for measuring fluid flow comprising:

a conduit having an elbow and an integral straight section downstream of said elbow, said straight section having a bottom wall;

a turbine assembly having a turbine with a permanent magnet mounted thereon, said turbine assembly being mounted downstream of said elbow in said straight section proximal said straight section bottom wall, wherein laminar fluid flowing along an outer bend of said elbow flows along said bottom wall and drives said turbine, said turbine assembly having a downstream cowl member, and said turbine is rotatably mounted on a shaft fixed to said cowl member, and said downstream cowl member has an integral trough member; and a Hall-effect sensor mounted adjacent said turbine for detecting rotation of said permanent magnet on said turbine.

12. A turbine flowmeter as claimed in claim 11, wherein said turbine assembly includes an upstream cowl member, and said trough member has projecting legs that align with legs on said upstream cowl member, said legs are received in parallel recesses formed in said bottom wall of said straight section.

13. A turbine flowmeter for measuring fluid flow comprising:

a conduit having an elbow and an integral straight section downstream of said elbow, said straight section having a bottom wall;

a turbine assembly having a turbine with a permanent magnet mounted thereon, said turbine assembly being mounted downstream of said elbow in said straight section proximal said straight section bottom wall, wherein laminar fluid flowing along an outer bend of said elbow flows along said bottom wall and drives said turbine;

a threaded opening formed in said outer bend of said elbow for insertion of said turbine assembly into said straight section of said conduit;

an elbow insert defining a continuation of said elbow portion of said outer bend across said opening;

a threaded plug received by said threaded opening that holds said elbow insert in place; and a Hall-effect sensor mounted adjacent said turbine for detecting rotation of said permanent magnet on said turbine.

14. A turbine flowmeter as claimed in claim 13, wherein said turbine assembly has an upstream cowl member and a downstream cowl member, said upstream cowl member has an integral trough member.

15. A turbine flowmeter as claimed in claim 14, wherein said integral trough member extends toward said elbow insert.

16. A turbine flowmeter as claimed in claim 14, wherein said trough member has projecting wings that align with wings on said downstream cowl member.

17. A turbine flowmeter as claimed in claim 16, wherein said wings are received beneath parallel rails extending from said wall of said straight section.

18. A turbine flowmeter as claimed in claim 16, wherein said wings terminate in stops that define the extent of insertion of said turbine assembly within said straight section of said conduit.

\* \* \* \* \*